Aug. 13, 1957  J. J. ARNHOLD  2,802,482
PISTON FLOAT VALVE
Filed Nov. 5, 1954

INVENTOR.
JOHN J. ARNHOLD
BY *Victor J. Evans Co.*
ATTORNEYS

United States Patent Office 2,802,482
Patented Aug. 13, 1957

2,802,482

PISTON FLOAT VALVE

John J. Arnhold, Victoria, Kans.

Application November 5, 1954, Serial No. 466,982

2 Claims. (Cl. 137—315)

This invention relates to a valve, and more particularly to a valve for use with well digging or pumping equipment.

The object of the invention is to provide a valve which is adapted to be mounted on the lower end of a well pipe or tubing whereby the movement or passage of material through the pipe can be readily controlled.

Another object of the invention is to provide a piston float valve which can be used in wells that are being worked and wherein the valve casing or cage can be mounted on the lower end of the well tubing and then the well tubing can be inserted into the ground and afterwards the piston can be permitted to drop down or pass down through the pipe into its proper position in the valve assembly.

A further object of the invention is to provide a piston float valve which is extremely simple and inexpensive to manufacture.

Other objects and advantages will be apparent during the course of the following description.

In the accompanying drawings, forming a part of this application, and in which like numerals are used to designate like parts throughout the same:

Figure 1:
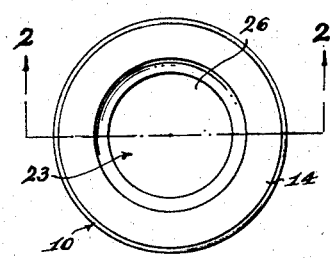
Figure 1 is a top plan view of the piston float valve, constructed according to the present invention.
Figure 4:
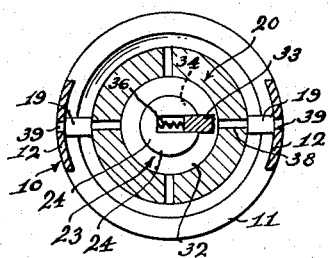
Figure 4 is a sectional view taken on the line 4—4 of Figure 2.
Figure 2:
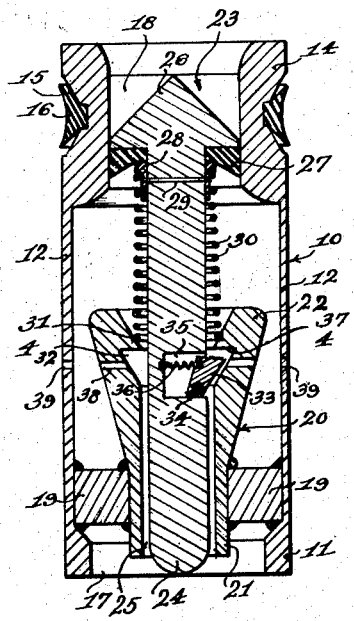
Figure 2 is a sectional view taken on the line 2—2 of Figure 1.

Referring in detail to the drawings, the numeral 10 designates a housing or cage which can be made of any suitable material such as metal, and the cage 10 includes a lower annular collar 11 which has its central portion open as at 17, Figure 2. Extending upwardly from the collar 11 and secured thereto or formed integral therewith is a plurality of spaced parallel ribs 12. Secured to the upper ends of the ribs 12 is an annular sleeve 14 which is provided with an annular groove 15 in its outer surface. A yieldable gasket or ring 16 is snugly seated in the annular groove 15. The central portion of the sleeve 14 is open as at 18 for a purpose to be later described.

Extending inwardly from the ribs 12 and secured thereto are support members 19, and a guide member 20 is secured as by welding to the inner ends of the support members 19. The guide member 20 includes a lower cylindrical portion 21 and an upper flaring or widened portion 22. Reciprocably or slidably mounted in the cage 10 is a piston 23 which includes a lower shank 24 that is slidably mounted in a longitudinally extending passageway 25 in the guide member 20. A head 26 of conical formation is formed integral with or secured to the upper end of the shank 24.

Circumposed on the upper end of the shank 24 and arranged contiguous to the undersurface of the head 26 is a yieldable ring or gasket 27. A bushing 28 abuts the undersurface of the ring 27, and a securing element is provided for retaining the bushing 28 in its proper position on the shank 24. A coil spring 30 is circumposed on the shank 24, and the coil spring 30 is interposed between an enlarged portion of the bushing 28 and the guide member 20 for normally urging the piston 23 upward so that the head 26 blocks the opening 18 in the sleeve 14. However when sufficient pressure builds up on top of the head 26, the entire piston 23 will move downwardly in the cage to permit fluid to pass through the spaces between the ribs 12 and through the opening 18 in the sleeve 14. Then, when pressure on the piston 23 decreases below a predetermined amount, the coil spring 30 will again return the parts to the position shown in Figure 2 so that no fluid can pass through the opening 18 since the head 26 and ring 27 effectively block off the interior of the sleeve. The lower end of the spring 30 is snugly seated in an annular notch or recess 31 which is formed in the flaring portion 22 of the guide member 20.

A means is provided for limiting upward movement of the piston 23, but this means permits downward movement of the piston. This means comprises an annular cutout 32 which is arranged in the interior of the guide member 20, and there is provided in the shank 24 of the piston 23 a recess or opening 35. A latch 33 is pivotally mounted in the recess 35 by means of a pin 34, and the latch 33 is mounted for movement into and out of the annular recess 32. A coil spring or spring member 36 serves to normally bias or urge the latch 33 outwardly as shown in Figure 2, so that the top of the latch 33 will bear against a shoulder 37 defined by the top of the cutout 32. Thus, when the latch 33 is in its outermost position upward movement of the piston 23 is prevented. A plurality of apertures or openings 38 are arranged in the guide member 20 whereby a suitable tool such as a small instrument can be inserted through the openings 38 to engage the latch 33 and force the latch 33 back into the recess 35 so that the piston 23 can be moved upwardly in the cage as when it is to be disassembled or removed for a purpose to be later described in this application. Apertures 39 are arranged in the ribs 12 and register with the apertures 38 so that the tool for depressing the latch 33 can be inserted through these registering apertures.

Figure 3:
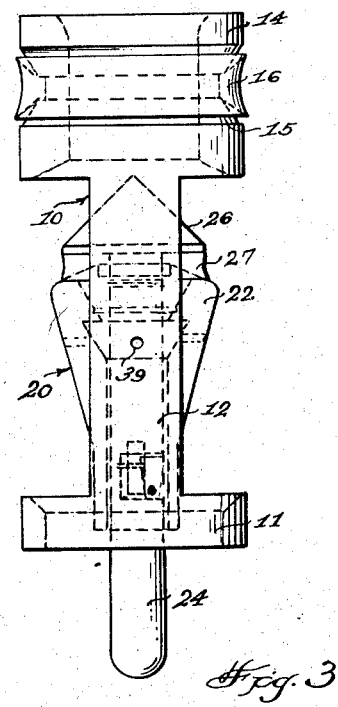
Figure 3 is a side elevational view of the valve of the present invention.

From the foregoing it is apparent that there has been provided a piston float valve which is especially suitable for use in wells such as oil or gas wells. In use the cage 10 can be engaged with the lower end of the well tubing which is inserted into the well so that the outer surface of the sleeve 14 and the ring 16 engage the inner surface of the well tubing. Then, the well tubing and cage are lowered into the well without the piston 23 therein. Thus, there will be no interference with flow of fluid into or out of the well pipe since the fluid can readily pass through the opening 18 in the sleeve 14 and through the space between the ribs 12. Then, when desired the piston 23 can be inserted in the well tubing so that it drops down whereby the piston 23 assumes the piston shown in Figure 2. The wide mouth 22 guides the shank 24 as it enters the guide member and with the piston 23 in the position shown in Figure 2 no fluid can pass through the space 18. However, when pressure above the piston 23 is sufficient to overcome the force of the spring 30, then the piston 23 will move downwardly to the position shown in Figure 3 so that the head 26 does not block the space 18 whereby fluid can readily pass through the valve and into or out of the well pipe. The latch 33 in the position shown in Figure 2 prevents upward movement of the piston 23, but the latch 33 permits downward movement of the piston as when the piston is being inserted in the cage. Thus, the present invention provides a check valve which permits flow of material in one direction only. In use the cage 10 of the valve is pushed up into the drill collar or drill pipe and the rubber packing ring 16 prevents mud or water from washing past the outside of the float. The piston 23 is pushed down when mud is being pumped into the drill pipe and this piston is pushed down through the float and drill bit. When the pressure on the mud or water is released, the spring 30 returns the piston to the position shown in Figure 2 so that mud and water cannot back up through the float and drill pipe. The rubber seal 27 prevents mud and water from going back up through the float accidentally, and the bushing 28 holds the ring 27 in place. The latch 33 permits the piston 23 to move downwardly under pressure but when pressure is released, the latch 33 limits upward movement of the piston. The guide member 20 is held in place by the support members 19. The float valve can be used in drilling where gas is expected since the piston 23 can be removed from the float cage 10 before putting the float inside of the drill collar or drill pipe whereby the inside of the drill pipe is left open. Then, before the pipe is removed from the hole, the piston 23 is dropped inside of the pipe and is pumped down into the float cage 10.

The valve can also be used in cases where circulating material is used in drilling mud. The piston is removed before putting the cage in the pipe and then the pipe is lowered in the hole and a steady stream of mud is permitted to flow through the drill bit and the float cage. The piston can then be pumped down into the cage whenever desired after the pipe is on the bottom of the well. Also, the piston can be removed from the cage before the pipe is put in the hole and the valve is ruggedly constructed and will not readily clog up or get out of working order. The valve can be made in any desired size.

I claim:

1. In a piston float valve, a cage including a lower cylindrical collar having its central portion open, a plurality of spaced parallel vertically disposed ribs extending upwardly from said collar, a cylindrical sleeve secured to the upper ends of said ribs, there being an annular groove in the outer surface of said sleeve, a plurality of support members extending inwardly from said ribs and secured thereto, a hollow guide member including a lower cylindrical portion secured to said support members, the upper portion of said guide member flaring outwardly, a piston slidably mounted in said cage and including a shank projecting into said guide member, a conical head on the upper end of said shank mounted for movement into and out of blocking relation with respect to the interior of said sleeve, a yieldable sealing ring circumposed on said shank and abutting the undersurface of said head, a bushing positioned on said shank and abutting said ring, a securing element extending through said bushing and into said shank, a coil spring circumposed on said shank and interposed between said bushing and said guide member, there being a recess in said guide member for receiving the lower end of said spring, there being a bore extending longitudinally through said guide member, said guide member having an enlarged annular cutout communicating with said bore, there being a recess in said shank, a latch pivotally mounted in said recess and mounted for movement into and out of said cutout, a coil spring for urging said latch outwardly, there being a plurality of spaced apertures in said guide member communicating with said cutout.

2. In a piston float valve, a cage including a lower collar having a central portion open, a plurality of ribs extending upwardly from said collar, a sleeve secured to the upper ends of said ribs, there being a groove in the outer surface of said sleeve, a plurality of support members extending inwardly from said ribs and secured thereto, a guide member including a lower portion secured to said support members, the upper portion of said guide member flaring outwardly, a piston slidably mounted in said cage and including a shank projecting into said guide member, a head on the upper end of said shank mounted for movement into and out of blocking relation with respect to the interior of said sleeve, a yieldable sealing ring circumposed on said shank and abutting the undersurface of said head, a bushing positioned on said shank and abutting said ring, a securing element extending through said bushing and into said shank, a coil spring circumposed on said shank and interposed between said bushing and said guide member, there being a recess in said guide member for receiving the lower end of said spring, there being a bore extending through said guide member, said guide member having a cutout communicating with said bore, there being a recess in said shank, a latch pivotally mounted in said recess and mounted for movement into and out of said cutout, a coil spring for urging said latch outwardly, there being a plurality of apertures in said guide member communicating with said cutout.

References Cited in the file of this patent

UNITED STATES PATENTS

| | | |
|---|---|---|
| 2,071,391 | Crowell | Feb. 23, 1937 |
| 2,185,173 | Fortune | Jan. 2, 1940 |